INVENTORS
DAVID J. KINNEY
JACK R. FAGG
DONALD P. SMITH

Bacon & Thomas
ATTORNEYS

United States Patent Office 3,452,689
Patented July 1, 1969

3,452,689
PRALINE AND CONFECTION DEPOSITOR
David J. Kinney, Sulphur Springs, and Jack R. Fagg and Donald P. Smith, Dallas, Tex., assignors to Candy Equipment Company, San Antonio, Tex., a corporation of Texas
Filed Aug. 23, 1967, Ser. No. 662,665
Int. Cl. A23g 3/12
U.S. Cl. 107—15                    5 Claims

ABSTRACT OF THE DISCLOSURE

A container for praline and confectionery material having a gate-controlled discharge opening, a cylinder axially slidable in the container to the wall surrounding the opening, piston means in the cylinder to push material from within the cylinder through the opening, and means for opeating the gate, cylinder and piston in timed relation to collect a measured quantity of praline or confection while the gate is closed and then open the gate and eject the collected material from the container.

Background of the invention

This invention relates to apparatus and a method for measuring and separating predetermined quantities of praline and confection material from a larger body thereof.

The praline or confection material referred to consists generally of a slurry or heavy carrier of cooked sugars or chocolate or the like in which a mass of nutmeats, fruits, cocoanut or the like are mixed. The material is separated into measured quantities and permitted to harden to form the confections commonly known as "Pralines." The praline or confection material is quite viscous and generally somewhat hard to handle. It has been perviously the practice to form the individual confections by separating the material by hand, which is not only time-consuming and inefficient but adds to the expense of the process.

Summary of the invention

According to the present invention the method and apparatus involved comprise a container in which a body of the premixed praline or confection material is held at an elevated temperature to maintain it in a plastic state. A wall of the container has a discharge opening and a slidable gate for opening and closing the same. A cylindrical piston is slidably mounted to move in the direction of its axis from a position wherein its open inner end is within the body of material in the container and directly toward tthe discharge opening. A piston in the cylinder is maintained substantially flush with the open end thereof during a portion of the movement of the cylinder and until it has reached a position spaced from the discharge opening a predetermined distance. At that time the piston is held stationary while the cylinder advances up to the wall surrounding the discharge opening and thus, the cylinder traps a generally cylindrical measured quantity of the material and the same is then within the cylinder, separated from the remainder of the material. Means are provided to then open a sliding gate and to thereafter advance the piston in the cylinder to eject the measured material through the discharge opening and onto a take-away conveyor belt. The apparatus includes means for effecting timed operation of the cylinder, piston and gate. A screw conveyor is used in illustrated embodiment to maintain a homogeneous mixture therein and the container is provided with a jacket therearound through which a heating medium is circulated to maintain the material warm enough to remain in a plastic state.

Description of the preferred embodiment

Figure 1:
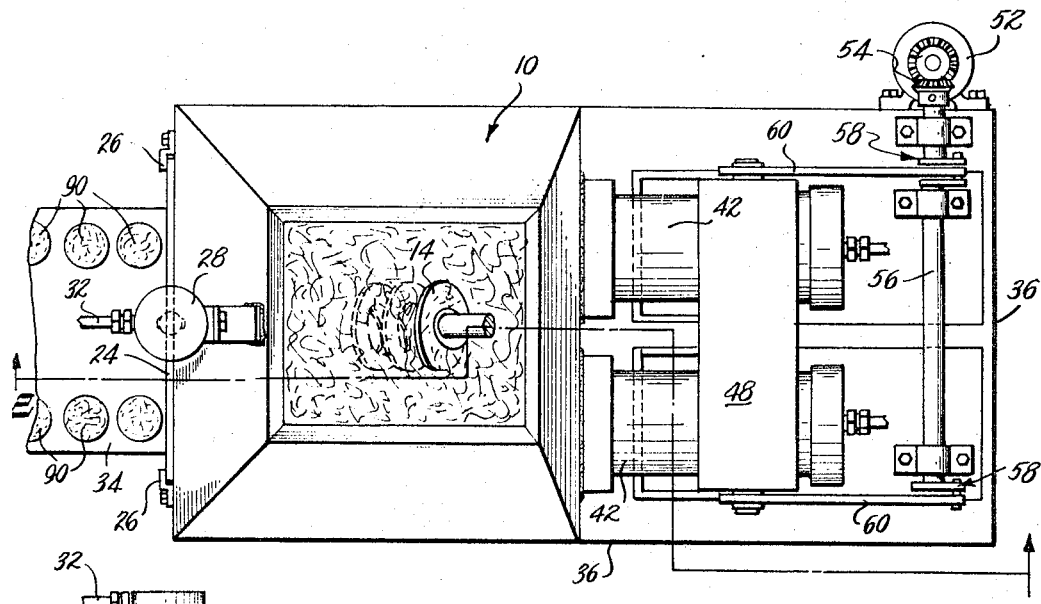
FIG. 1 is a plan view, with certain parts shown in section, and comprising a schematic illustration of an apparatus embodying the principles of the present invention.

In the drawings, numeral 10 indicates generally a container with a rotary screw agitator 14 therein. The praline or confection material can be described generally as comprising a praline or confection slurry, usually a boiled sugar, having nutmeats or the like mixed throughout the same. The nuts usually employed are pecans, although others may be used. Those skilled in this art will readily understand the nature of the material as being viscous and somewhat sticky but also somewhat fluent or plastic in its initial and heated state. To maintain the material 16 in a plastic state in the container 10, the latter is provided with means defining a suitable heating jacket 18 through which a heating medium 20, such as hot water or the like, is circulated at temperatures of from 80° to 210° F. but usually at about 185° F.

One side wall of the container 10 is provided with a discharge opening 22 therethrough and over which a slidable gate 24 can be moved. The gate 24 is suitably guided against the exterior surface of the container wall by guide means 26 and a pneumatic motor 28 mounted on the container 10 acts through its piston rod 30 to move the gate 24 between its upper and lower positions wherein the opening 22 is respectively opened and closed. The pneumatic motor 28 is a double-acting motor having suitable conduits 32 connected to the opposite ends thereof in a well-known manner whereby the motor can be actuated to drive the gate 24 either upwardly or downwardly.

Adjacent the container 10 and below the opening 32 a take-away conveyor belt 34 is positioned and driven so that the upper run thereof moves away from the container. As will be described, successive measured and severed bodies of the praline or confection material are discharged through the opening 22 whereupon they fall upon the belt 34 and are delivered to the next processing station.

The container 10 is shown as supported on a framework 36, upon which conveyor roller 38 is also journalled. The side wall of the container 10 directly opposite the discharge opening 22 is provided with a suitable guide sleeve 40 for slidably guiding a cylinder structure 42 through that side wall for sliding movement along the axis of the cylinder 42. As shown, the axis of the cylinder is aligned with about the center of the discharge opening 22. It is to be noted that the leading edge 44 moves through an interior portion of the material 16, that is, along a path spaced laterally from the nearest walls of the container 10. The diameter of the leading edge 44 is substantially equal to the diameter of the discharge opening 22. The cylinder structure 42 extends slidably through the guide sleeve 40 and suitable sealing rings or the like 46 may be provided. At its outer end, outside the container 10, the cylinder structure 42 is connected to a cross-head 48 slidably guided by suitable rails or the like 50 on supporting frame 36 for sliding movement. As shown in FIG. 1, a drive motor 52 drives through bevel gears 54 to a crankshaft 56 journailed on the frame 36. As shown in FIG. 1, the machine comprises two of the cylinder structures 42, each connected to the same cross-head 48. However, this is merely illustrative since any desired number of pistons and corresponding discharge openings 22 may be provided so as to simultaneously deposit on belt 34 any desired number of praline or confection bodies. Since all cylinder structures will be duplicates, only one will be described in detail. The crankshaft 56 is provided with a pair of cranks 58 pivotally connected to connecting rods 60 which in turn are pivotally connected to the cross-head 48. Thus, rotation of the shaft 56 will cause reciprocation of the cross-head 48 and cause the cylinders connected thereto to slide through the guide sleeves 40 in repeated cycles of reciprocation. The parts are so dimensioned and the stroke of the cranks 58 is such that the annular leading edge 44 reciprocates through a stroke of about five inches, for example, assuming that the inner diameter of the cylinder defining the leading edge is about two inches. At its forward position, the position at the extreme left side of FIG. 2, the annular leading edge 44 engages the inner surface of the container wall about the periphery of the discharge opening 22, as will be further described later.

Figure 2:
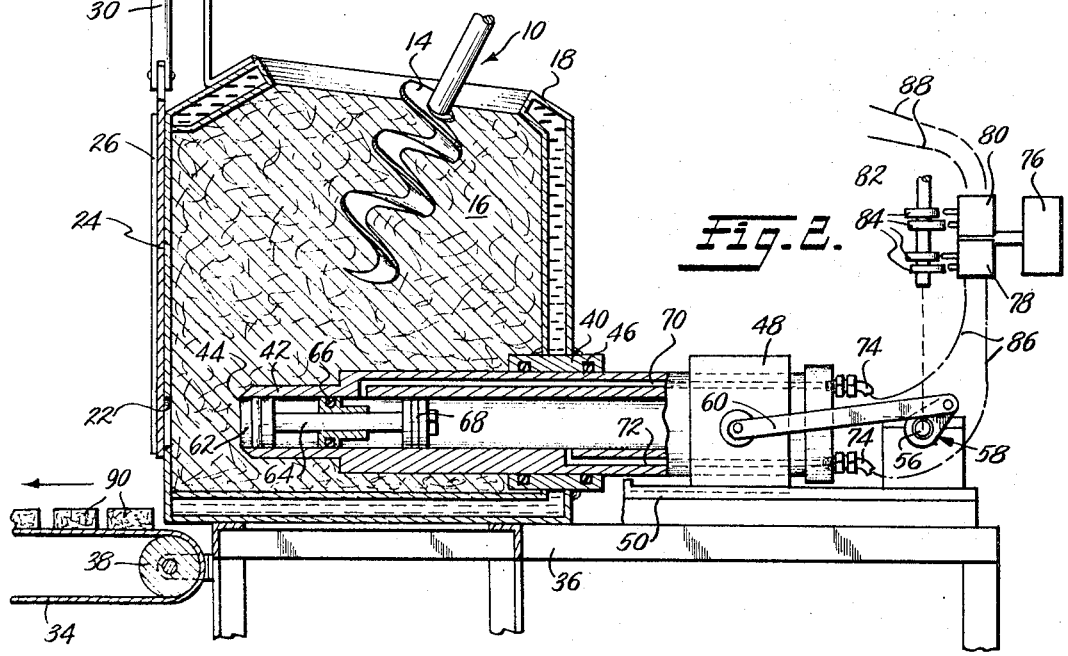
FIG. 2 is a vertical sectional view taken along the line 2—2 of FIG. 1.
Figure 3:
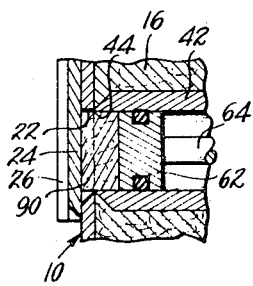
FIGS. 3, 4, 5, 6, and 7 are enlarged fragmentary sectional views showing the sequence of movements of the parts illustrated.
Figure 4:
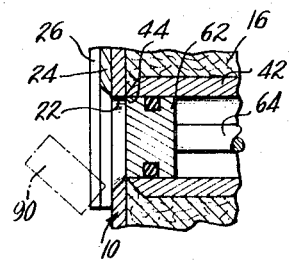
Figure 5:
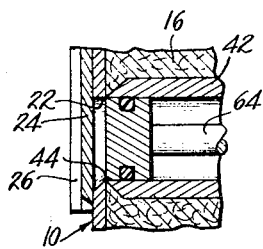

The cylinder structure 42 is a hollow tubular structure having a piston member 62 slidable therein. The piston 62 is actuated by a piston rod 64 guided by a suitable guide bushing 66 fixed within the cylinder 42. At its rear end the piston rod 64 has a motor piston 68 fixed thereto and passageways 70 and 72 in or adjacent to the walls of the cylinder provide communication between the outer or rear end of the piston 62 and the interior thereof on respecively opposite sides of motor piston 68. Through suitable conduits 74, the passageways 70 and 72 are supplied with compressed air to provide a vent, all as will be described. Only diagrammatically shown in FIG. 2 is a source of compressed air 76 and a control valve 78 for controlling the pressure in the conduits 74, a control valve 80 for controlling air delivered to the conduits 32 for pneumatic motor 28 and a cam shaft 82 having cams 84 thereon for controlling operation of the valves 78 and 80. As suggested in FIG. 2, the cam shaft 82 is driven from and in timed relation to the crankshaft 56 although the cams 84 could be on shaft 56 itself. Further detailed description of the cam shaft and valves is deemed unnecessary since those skilled in the art will readily perceive types of valve that may be employed.

It is understood that the conduits suggested by dotted lines 86 provide connection between the valve 78 and conduits 74 and that the conduits schematically suggested at 88 will connect the valve 80 to the conduits 32.

The cams 84 are so positioned and configured on the cam shaft 82 that they will actuate the piston 62 in cylinder 42 and will actuate the pneumatic motor 28 in a preset timed relationship, which will be described later. Obviously, the valves 78 and 80 are so arranged that when they direct air pressure to one end of their respective pneumatic motors, the other end thereof is vented.

Figure 6:
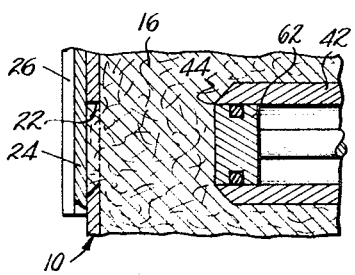

Referring now to FIGS. 3 to 7, FIG. 3 shows the position of the parts after the cylinder 42 has been advanced and projected into contact with the side wall of the container having discharge opening 22 therein, with the annular leading edge 44 in engagement with the container side wall and with piston 62 spaced inwardly from that knife edge. This is the position assumed by the parts immediately following the advancing stroke of cylinder 42. As shown, the gate 24 is closed and a measured body 90 of praline or confectionery material has been severed from the body 16 of the material in that container and is maintained separated therefrom. After the parts reach the relative position shown in FIG. 3, the cam shaft 82 operates to actuate pneumatic motor 28 to thereby lift or open gate 24 and immediately thereafter the valve 78 is actuated to advance the piston 62 to the position shown in FIG. 4 whereupon the body 90 of praline or confectionery material is ejected from the cylinder 42 and through the discharge opening 22 where it falls upon the conveyor belt 34. After the body 90 has been discharged as described, the gate 24 is then closed to the position of FIG. 5. It is found that the particular praline or confectionery material employed adheres to piston 62 and does not drop therefrom, the piston could be caused to advance through the opening 22 so that the lower edge of gate 24 would actually strip the material of body 90 from the face of piston 62. As shown in the drawings by way of example, the piston remains substantially flush with the open end of cylinder 42. After the gate 24 has been closed to the position of FIG. 5, the cranks 58 and connecting rods 60 then start to retract the cylinder 42 by sliding the same rearwardly through the guide 40. During this retracting movement of cylinder 42, the valve 78 remains in fixed position so that the piston 62 moves with the cylinder 42 while remaining at the outer end thereof during this retracting stroke. As shown in FIG. 6, retraction of the cylinder 42 to the inner position shown permits the body of praline or confectionery material 16 in container 10 to flow into the space between the piston 62 and discharge opening 22 to fill the same with a representative sampling of the material 16 and to enter and fill the small volume defined by the opening 22 itself. After the rearward stroke of cylinder 42 is completed, the connecting rods 60 then move the cylinder 42 and piston 62 forwardly again toward the opening 22 to the position illustrated in FIG. 7. During this forward movement the piston 62 and cylinder 42 again move forwardly as a unit until the piston 62 is spaced from the adjacent side wall of the container 10 such a distance that the volume of an imaginary cylinder of praline or confectionery material between the face of the piston member and the gate 24 is the desired predetermined volume. At this point the valve 78 is actuated by cam shaft 82 to introduce air under pressure through passageway 70 and thus retract piston 62 to the right (FIG. 7) relative to cylinder 42. That retraction is at a controlled rate such that it equals the rate of advance of the cylinder 42 toward the discharge opening. The net result is that the piston 62 remains stationary relative to the container 10 while the cylinder 42 advances to the position shown in FIG. 3. This advance movement will collect or trap the body 90 separated from the remaining material 16 to define a substantially cylindrical body extending from the piston element 62 to the boundary surface of the material 16, which is defined by the inner face of gate 24. After the parts reach the position shown in FIG. 3, as just described, the cycles already described are repeated and successive bodies 90 are deposited on the conveyor belt 34.

Figure 7:
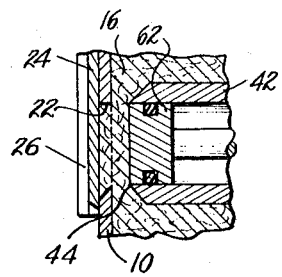

It is contemplated that suitable adjustments be provided to regulate the distance from piston 62 to gate 24, in the condition shown in FIG. 7, so that weight of the bodies 90 may be adjusted from about ½ ounce to 1½ ounces.

While a single specific embodiment of the invention has been shown and described herein, the same is merely illustrative of the principles involved and obviously many other forms of apparatus may be resorted to within the scope of the appended claims.

We claim:

1. A praline or confectionery depositor comprising: a container for praline or confectionery material having a discharge opening in one wall thereof, said one wall being of relatively thin sheet material; an open-ended tubular cylinder, in said container, movably mounted for axial movement in a direction to move the open end thereof toward and from said discharge opening; the inside diameter of the open end of said cylinder being no larger than said discharge opening; a piston axially slidable in said cylinder adjacent said open end; gate means slidable along the outer surface of said one wall for opening and closing said discharge opening; and means for cyclically actuating said cylinder, piston and gate means in timed relation to project the open end of said cylinder to the wall encompassing said discharge opening with said piston spaced inwardly from said open end to trap a predetermined quantity of praline or confectionary material in said cylinder between said piston and said gate means, to then open said gate means, then move said piston to said open end to discharge said material through said opening without substantial deformation of said material, then to close said gate means and withdraw said piston and cylinder into said container inwardly of said opening; said discharge opening being bounded by only the relatively thin edge of said one wall.

2. A praline or confectionery depositor as defined in claim 1 including jacket means surrounding said container for holding a heating medium to maintain said praline material in said container in a plastic state.

3. A praline or confectionery depositor as defined in claim 1 wherein said means for actuating said piston and said gate means comprise pneumatic motors.

4. A praline or confectionery depositor as defined in claim 1 wherein said open end of said cylinder is spaced from those boundary walls of said container adjacent said one wall.

5. A praline or confectionery depositor as defined in claim 1 wherein said means for ejecting said material comprises a piston slidable in said cylinder; a pneumatic motor within said cylinder for actuating said piston; and means outside said container for controlling operation of said motor.

References Cited

UNITED STATES PATENTS

| | | | |
|---|---|---|---|
| 1,795,236 | 3/1931 | Schupp | 222—381 |
| 2,383,536 | 8/1945 | Elliott. | |
| 2,609,966 | 9/1952 | Henry | 107—27 |
| 2,872,245 | 2/1959 | Groth | 107—27 |
| 3,218,994 | 11/1965 | Valentyne. | |

ROBERT W. MICHELL, *Primary Examiner.*

ARTHUR O. HENDERSON, *Assistant Examiner*

U.S. Cl. X.R.

18—30; 222—381